(12) United States Patent
Raffler

(10) Patent No.: US 7,226,101 B2
(45) Date of Patent: Jun. 5, 2007

(54) ADJUSTABLE BOSS

(75) Inventor: David W. Raffler, Shelby Township, MI (US)

(73) Assignee: SportRack LLC, Sterling Heights, MI (US)

( * ) Notice: Subject to any disclaimer, the term of this patent is extended or adjusted under 35 U.S.C. 154(b) by 0 days.

(21) Appl. No.: 11/272,372

(22) Filed: Nov. 10, 2005

(65) Prior Publication Data

US 2006/0103157 A1 May 18, 2006

Related U.S. Application Data

(60) Provisional application No. 60/627,294, filed on Nov. 12, 2004.

(51) Int. Cl.
*B62D 27/00* (2006.01)
(52) U.S. Cl. .................. 296/29; 224/309; 224/326; 296/180.1
(58) Field of Classification Search ................ 296/29, 296/1.08, 180.1; 224/309, 326
See application file for complete search history.

(56) References Cited

U.S. PATENT DOCUMENTS

| | | | | |
|---|---|---|---|---|
| 3,239,988 A | * | 3/1966 | Engelbert | 52/718.04 |
| 3,473,773 A | * | 10/1969 | Engelbert | 248/222.41 |
| 3,734,447 A | * | 5/1973 | Perison, Sr. | 248/481 |
| 4,162,755 A | * | 7/1979 | Bott | 224/326 |
| 4,277,009 A | * | 7/1981 | Bott | 224/309 |
| 4,406,386 A | * | 9/1983 | Rasor et al. | 248/297.21 |
| 4,448,336 A | * | 5/1984 | Bott | 224/309 |
| 4,469,261 A | * | 9/1984 | Stapleton et al. | 224/321 |
| 4,473,178 A | * | 9/1984 | Bott | 224/324 |
| 4,838,467 A | * | 6/1989 | Bott et al. | 224/326 |
| 4,911,348 A | * | 3/1990 | Rasor et al. | 224/326 |
| 5,025,967 A | * | 6/1991 | Cronce et al. | 224/309 |
| 5,106,147 A | * | 4/1992 | Okada et al. | 296/180.1 |
| 5,338,088 A | * | 8/1994 | Stanesic | 296/180.1 |
| 5,699,944 A | * | 12/1997 | Duran | 224/326 |
| 5,810,226 A | * | 9/1998 | Lee | 224/309 |
| 5,860,576 A | * | 1/1999 | Duran | 224/326 |
| 5,979,723 A | * | 11/1999 | Tress et al. | 224/309 |
| 6,070,774 A | * | 6/2000 | Rak et al. | 224/309 |

* cited by examiner

*Primary Examiner*—Kiran B. Patel

(57) ABSTRACT

An adjustable boss for securing an article carrier or rack assembly to a vehicle outer surface is disclosed. The adjustable boss is disposed between the rack assembly and the vehicle outer surface is employed having a body including an upper surface and a lower surface. A first protrusion extends away from the lower surface. A second protrusion extending away from the upper surface. The protrusions define an aperture whereby the first protrusion engages the vehicle outer surface.

8 Claims, 10 Drawing Sheets

ADJUSTABLE BOSS

CROSS-REFERENCE TO RELATED APPLICATIONS

This application claims the benefit of U.S. Provisional Application Ser. No. 60/627,294 filed Nov. 12, 2004, which is hereby incorporated by reference in its entirety.

TECHNICAL FIELD

The embodiments described herein are generally directed to adjustable securement structures.

BACKGROUND

Luggage carriers or article rack assemblies are used in a variety of applications to transport articles above an outer body surface of a vehicle. The rack assembly generally has an elevated frame that is supported above the vehicle surface by a plurality of support structures such as brackets or stanchions that connect the frame to the vehicle.

The frame may include a pair of side rails which extend longitudinally between the support assemblies, one or more cross rails that extend transversely between the side rails, and a support structure at each end of a side rail.

To facilitate the connection between the assemblies and the vehicle, apertures are placed in the vehicle surface. Fasteners are disposed between an assembly and the corresponding vehicle connection apertures. Vehicle surfaces are built with pre-determined tolerances as part of the vehicle surface specification. To account for these and other tolerances the assemblies typically include slots that receive the fasteners and to also permit the assemblies to adjust or slide in a fore and aft position.

Typically, the fasteners are bolts having a large head portion at a first end and a threaded shank portion at an opposing second end for threadingly engaging the connection apertures. The large head portion is used to seal the entire slot receiving the fastener to prevent fluid intrusion and take into account the largest tolerance specified on the vehicle surface. Fluids and other undesired contaminants would otherwise intrude into the aperture, flow down the shank portion, and leak into the vehicle interior.

Unfortunately, the packaging of the rack assemblies or the specification makes the use of fasteners with larger heads unavoidable. Thus, it would be desirable to have a structure that accounts for the build tolerances on vehicle surfaces, prevents the undesirable intrusion of contaminants into a vehicle, and permits the use of a fastener with a smaller head.

SUMMARY

In the embodiments described, an adjustable boss disposed between a rack assembly and a vehicle outer surface is employed having a body including an upper surface and a lower surface. At least a first protrusion extends away from the lower surface. At least a second protrusion extends away from the upper surface. In one disclosed embodiment, the protrusions define an aperture whereby the first protrusion engages the vehicle outer surface.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION

Figure 1:
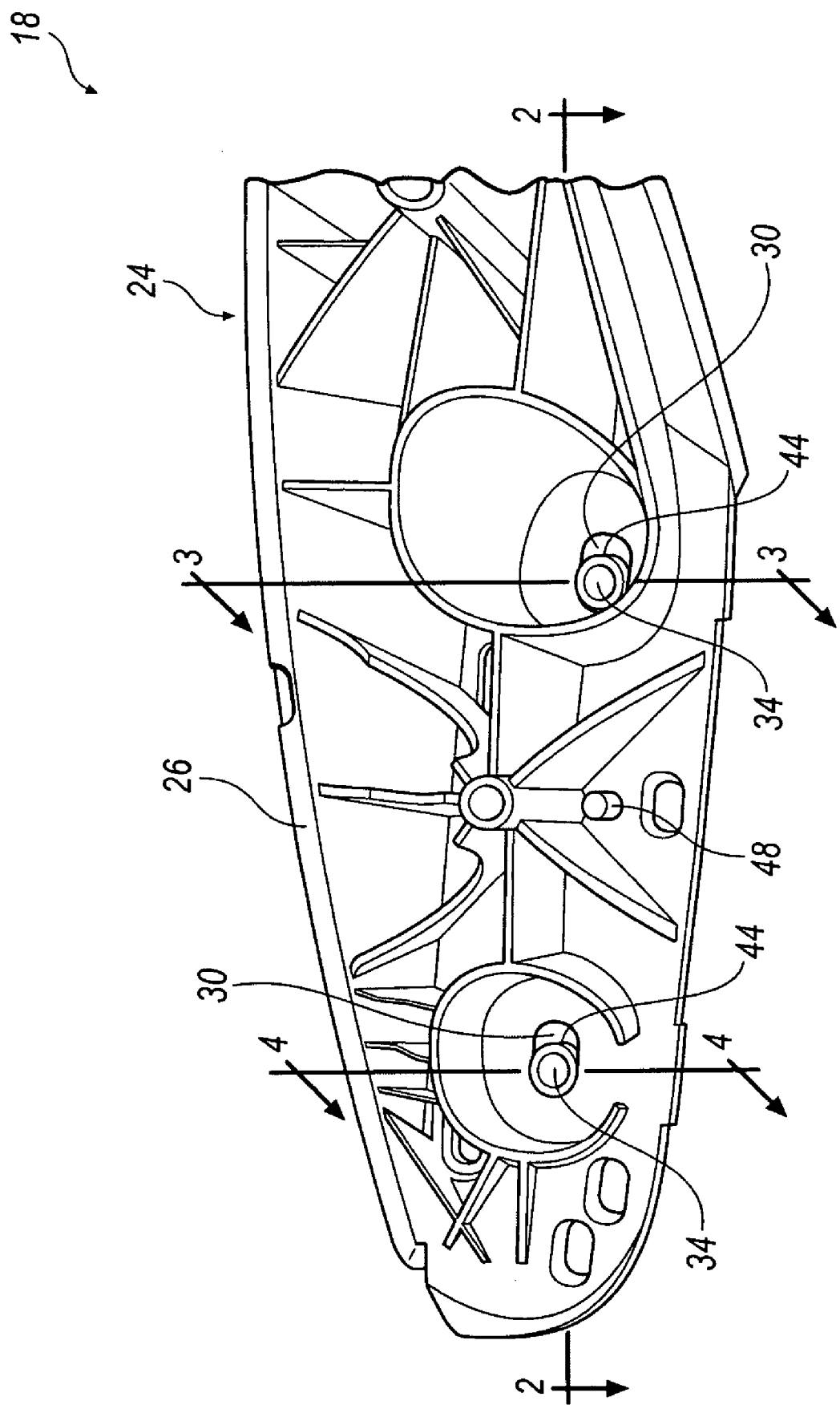
FIG. 1 is an elevational perspective view of one embodiment of an adjustable boss showing a rail mount without a cover.

Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limit or restrict the invention to the precise form and configuration shown in the drawings and disclosed in the following detailed description.

Referring now to FIGS. 1–6 and 8, an innovative adjustable boss assembly 18 is shown wherein an adjustable boss 20 adjusts in at least one direction to accommodate build tolerances on a vehicle outer surface 22 when mounting a component such as an article rack assembly 24 to the vehicle outer surface 22.

Components such as article rack assemblies (not shown) are used in a variety of applications to transport items above the outer surface 22 of a vehicle. The vehicle outer surface may be a vehicle roof top, rear deck, cargo bed, and the like. The rack assembly 24 generally includes an elevated frame that is supported above the vehicle outer surface 22 by a plurality of support structures 26 that connect the frame to the vehicle outer surface 22.

The frame may include a pair of side rails (not shown), which extend longitudinally between the support structures 26 such that the support structures are positioned adjacent opposing ends of each of the side rails, and one or more cross rails that extend transversely between the side rails.

Figure 2:
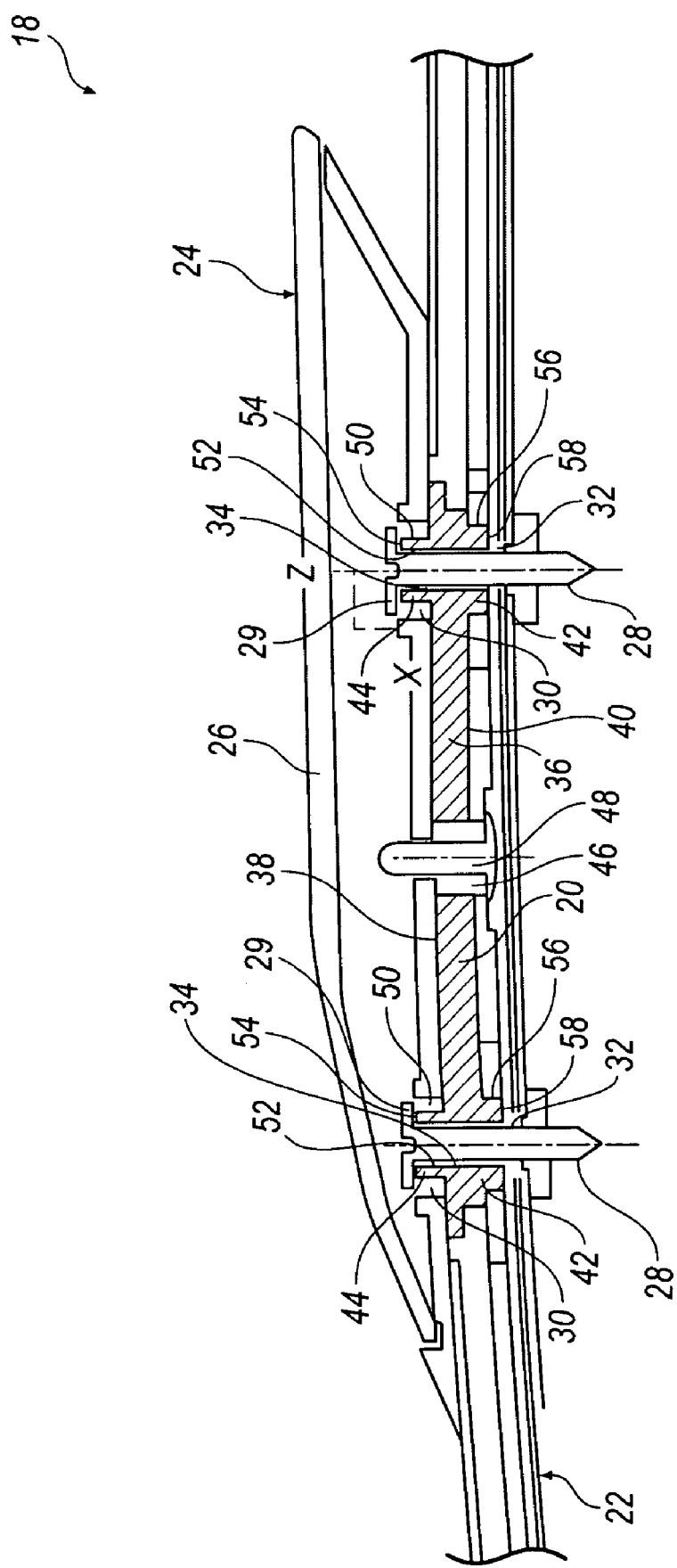
FIG. 2 is a cross-sectional view of the adjustable boss of FIG. 1 taken along sectional line 2—2.
Figure 3:
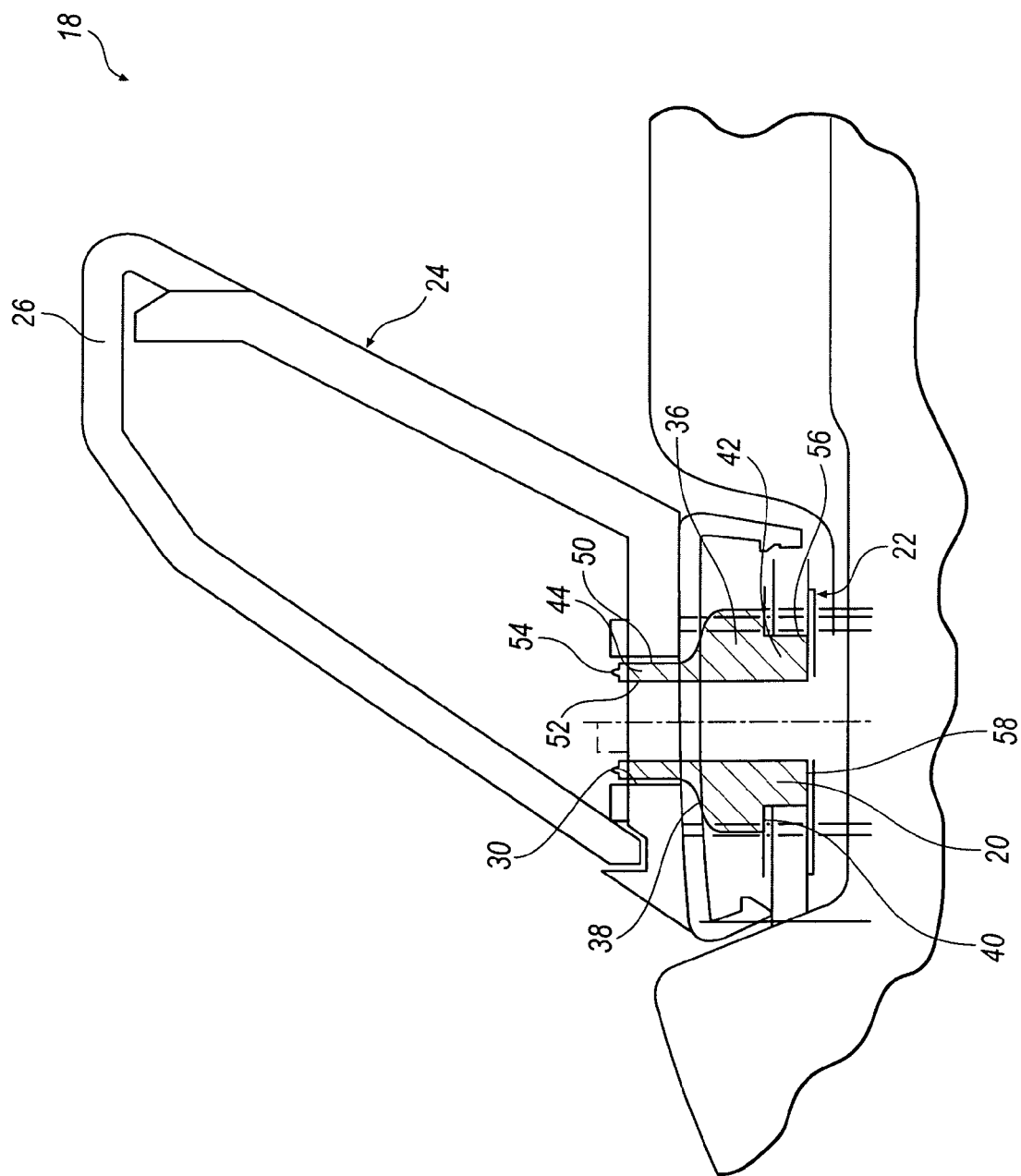
FIG. 3 is a cross-sectional view of the adjustable boss of FIG. 1 taken along sectional line 3—3.
Figure 4:
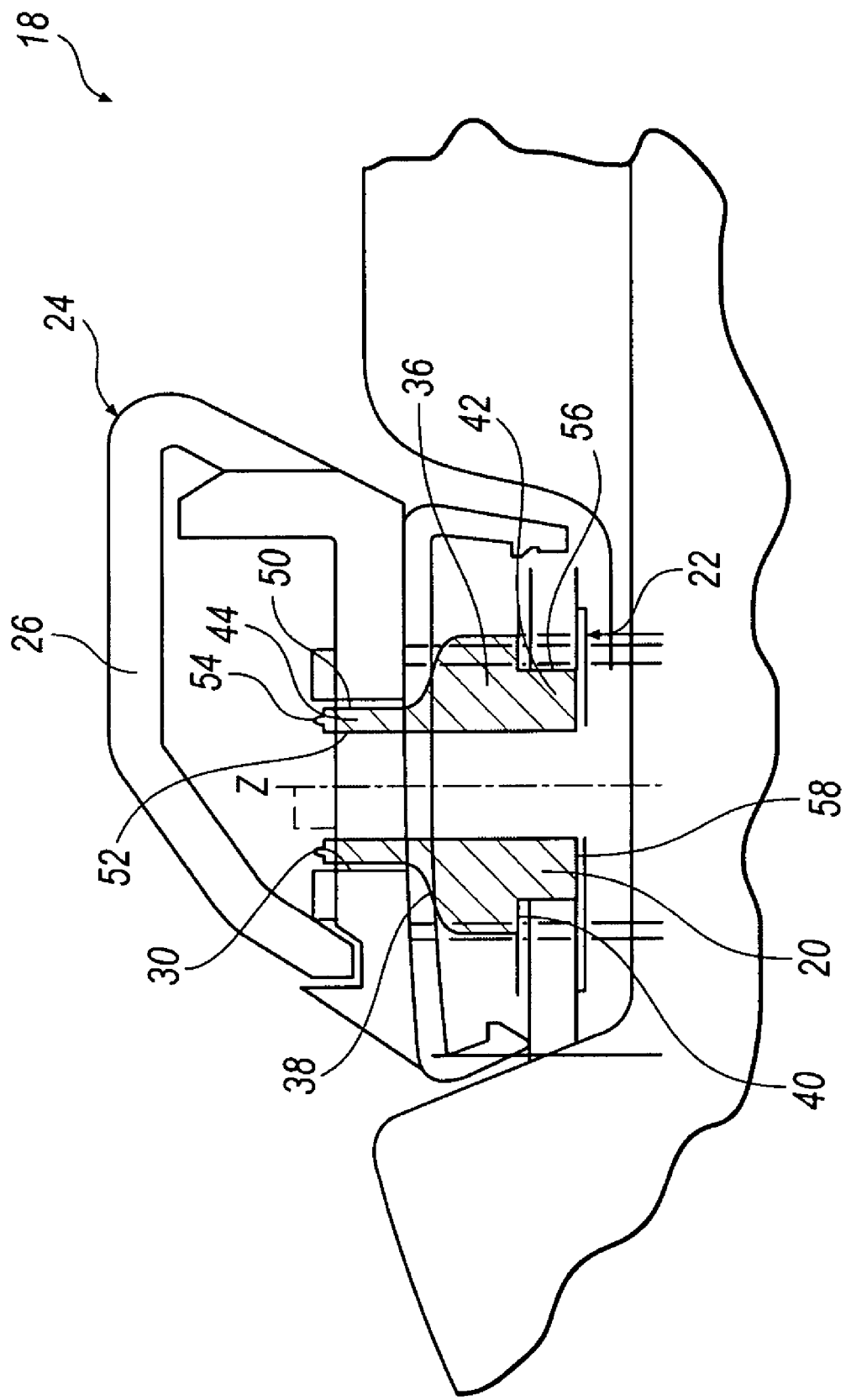
FIG. 4 is a cross-sectional view of the adjustable boss of FIG. 1 taken along sectional line 4—4.

As shown in FIG. 2, fasteners 28 having a fastener head 29 adjacent a first end are used to connect or otherwise secure the support structure 26 to the vehicle outer surface 22. The fasteners 28 are attached through large slots 30 that are included in the support structures 26 to account for vehicle surface build tolerances and selective movement of the article carrier. Vehicle outer surfaces 22 are built with predetermined tolerances as part of the vehicle surface specification. During manufacture, apertures 32 are formed through the vehicle outer surface 22. Thus, components such as the support structure 26 attached to the vehicle outer surface 22 must be able to accommodate for the tolerances associated with placement of aperture 32 and its formation in relationship to the rest of the outer body surface and associated apertures 32 positioned at a different location on the outer surface 22.

The components or article rack assemblies 24 include at least one slot 30 that is adapted to permit securement to the vehicle outer surface 22 while allowing the article rack assembly 24 to adjust or slide in at least one direction. In the illustrated embodiment, the slot 30 permits fore and aft movement, but other types of movement may be included. For example, lateral movement or combinations of movement may be desirable in other embodiments.

The adjustable boss 20 accounts for the build tolerances on vehicle outer surface 22, any necessary movement of rack assembly 24, and helps to minimize the undesirable intrusion of potential contaminants such as fluids into a vehicle inner compartment. Significantly, it allows for the use of the fastener 28 with a fastener head 29 that is much smaller (e.g., having a smaller diameter) as compared to traditional fasteners. The adjustable boss 20 provides the flexibility of using the fastener 28 having a smaller head 29 to seal boss apertures 34, which have a diameter less than that of corresponding apertures 32, created between the article rack assembly 24 and the outer vehicle surface 22. Yet, the disclosed arrangement still allows for any necessary movements provided for by the slot 30 on the article rack assembly 24. Thus, the existence of the adjustable boss 20 reduces the size of the aperture required between the article rack assembly 24 and the vehicle outer surface 22 to seal of the large slot 30 provided on the article rack assembly 24.

Referring to FIGS. 1–6 and 8, the innovative adjustable boss 20 includes an adjustable body 36 having an upper surface 38 and a lower surface 40. At least one first protrusion 42 extends outwardly from the lower surface 40 of the body 36. At least one second protrusion 44 extends outwardly from the upper surface 38 of the body 36. In the illustrated embodiment, the protrusions 42, 44 define the aperture 34. While aperture 34 is shown as extending along a single axis, in some embodiments, the protrusions and resulting aperture may be offset so long as fastener 28 may still be utilized.

The adjustable boss 20 according to one embodiment, as shown in FIGS. 1–6 and 8 illustrates the body 36 having at least two first protrusions 42. However, any number of first protrusions 42 is contemplated. The body 36 may include a slot 46 that is adapted to receive a fastener 48 for securing the body 36 to the support structure 26 of the article rack assembly 24. The slot 46 is large enough to allow the intended motions of the adjustable boss 20 without impeding the predetermined distance of travel desired by the adjustable boss 20. The slots 30 on the support structure 26 may further provide a stable environment for the adjustable boss 20 by preventing the body 36 from rotating about the axis defined by fastener 48. Rotation is also prevented by having each of the second protrusions 44 in communication with the respective slot 30 disposed on the support structure 26 of the article rack assembly 24 discussed further below.

The adjustable boss 20 may include one or any plurality of protrusions 42 extending from the lower surface 40 of the body 36. The body 36 is secured to each protrusion 42, 44 by any manufacturing method including gluing, molding, welding and the like. The protrusions 42, 44 may also be integral with the body 36. The adjustable boss 20 may be secured to the rack assembly 24 by the common fastener 28 or by any means of attaching the adjustable boss 20 to the rack assembly 24. Other attachment mechanisms or means may be used including: using molded protrusions to secure the adjustable boss 20; an integrated housing around the adjustable boss 20; molded fixtures for securing the adjustable boss 20; and threaded fasteners between the adjustable boss 20 and the support structure 24. The adjustable boss 20 may be formed from plastic, polyimide resin, aluminum, polypropylene, or nylon polymer. While the adjustable boss 20 may be formed using a variety of approaches, it is preferably molded. The adjustable boss 20 does not have to be secured to the rack assembly 24 prior to being secured to the vehicle outer surface 22. It may be placed between the vehicle outer surface 22 and the rack assembly 24 and secured therebetween during assembly of the vehicle rack.

The upper protrusion 44 helps to define the aperture 34 as discussed above and includes an outer surface 50, an inner surface 52, and an upper surface 54. The upper protrusion 44 extends outwardly and upwardly from the body 36 a predetermined distance terminating at the upper surface 54. The lower protrusion 42 also helps to define the aperture 34 as discussed above and includes an outer surface 56, the inner surface 52, and a lower surface 58. The lower protrusion 42 extends outwardly and downwardly from the body 36 a predetermined distance terminating at the lower surface 58. The protrusions 42, 44 may be any shape including generally circular, oval, square, rectangular, and the like. The material for the protrusions 42, 44 may be the same material as the body but may also be formed from a different material including plastic, polyimide resin, aluminum, polypropylene, or nylon polymer.

Figure 5:
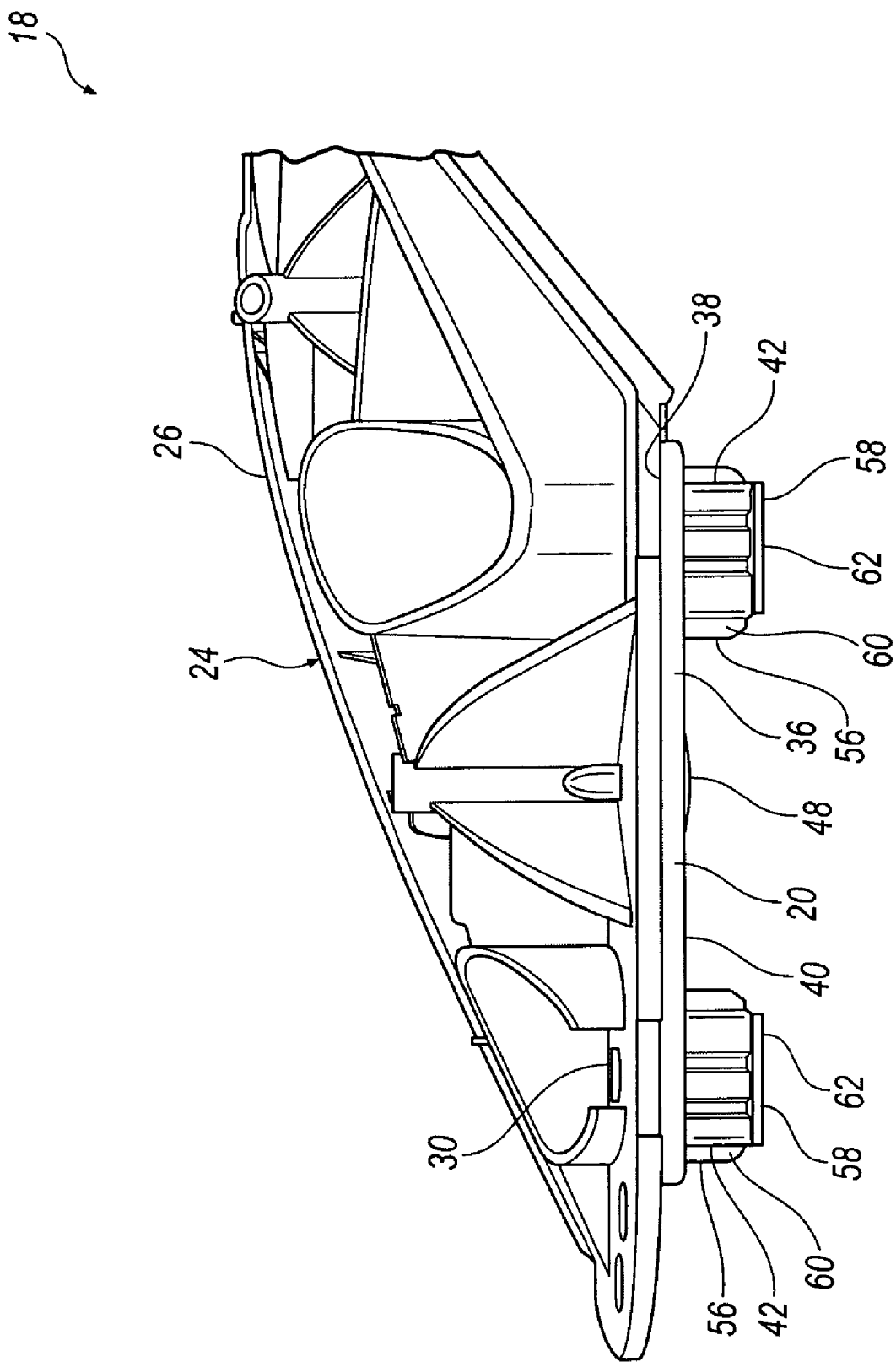
FIG. 5 is an elevational side view of the adjustable boss of FIG. 1.
Figure 6:
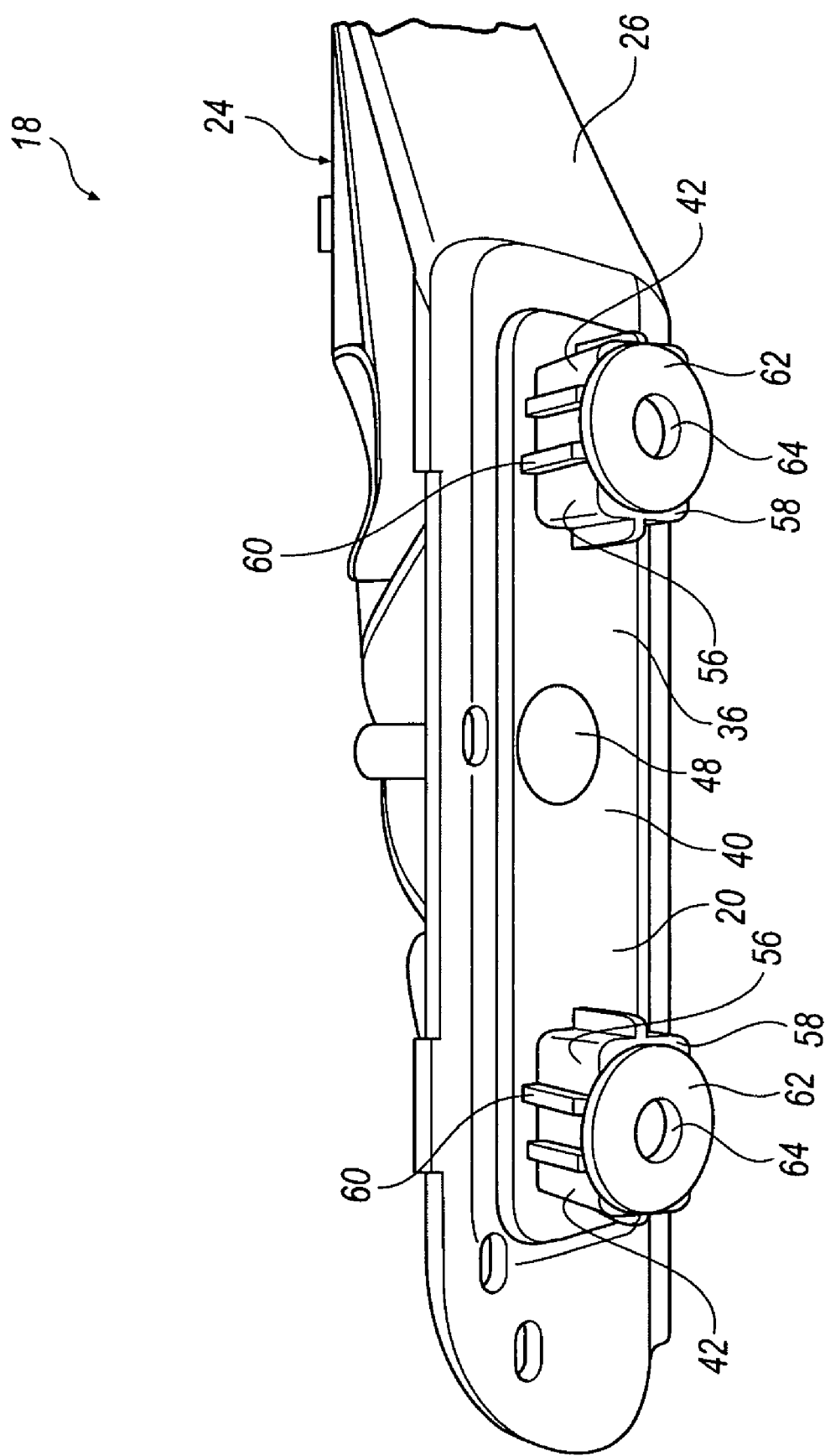
FIG. 6 is an elevational bottom view of the adjustable boss of FIG. 1.
Figure 7:
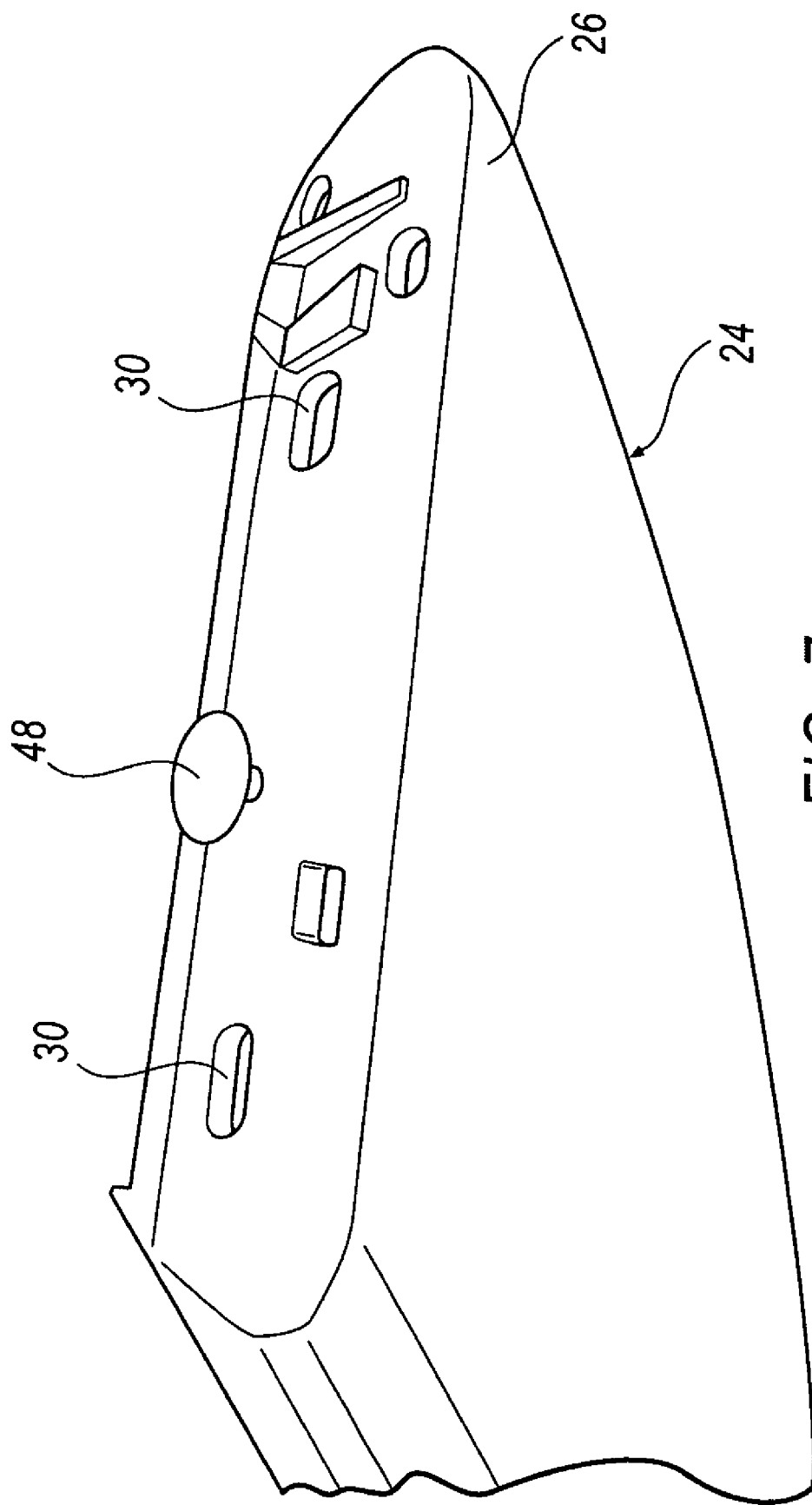
FIG. 7 is an elevational perspective view of a bottom surface of the rail mount of FIG. 1 without the adjustable boss of FIG. 1.
Figure 8:
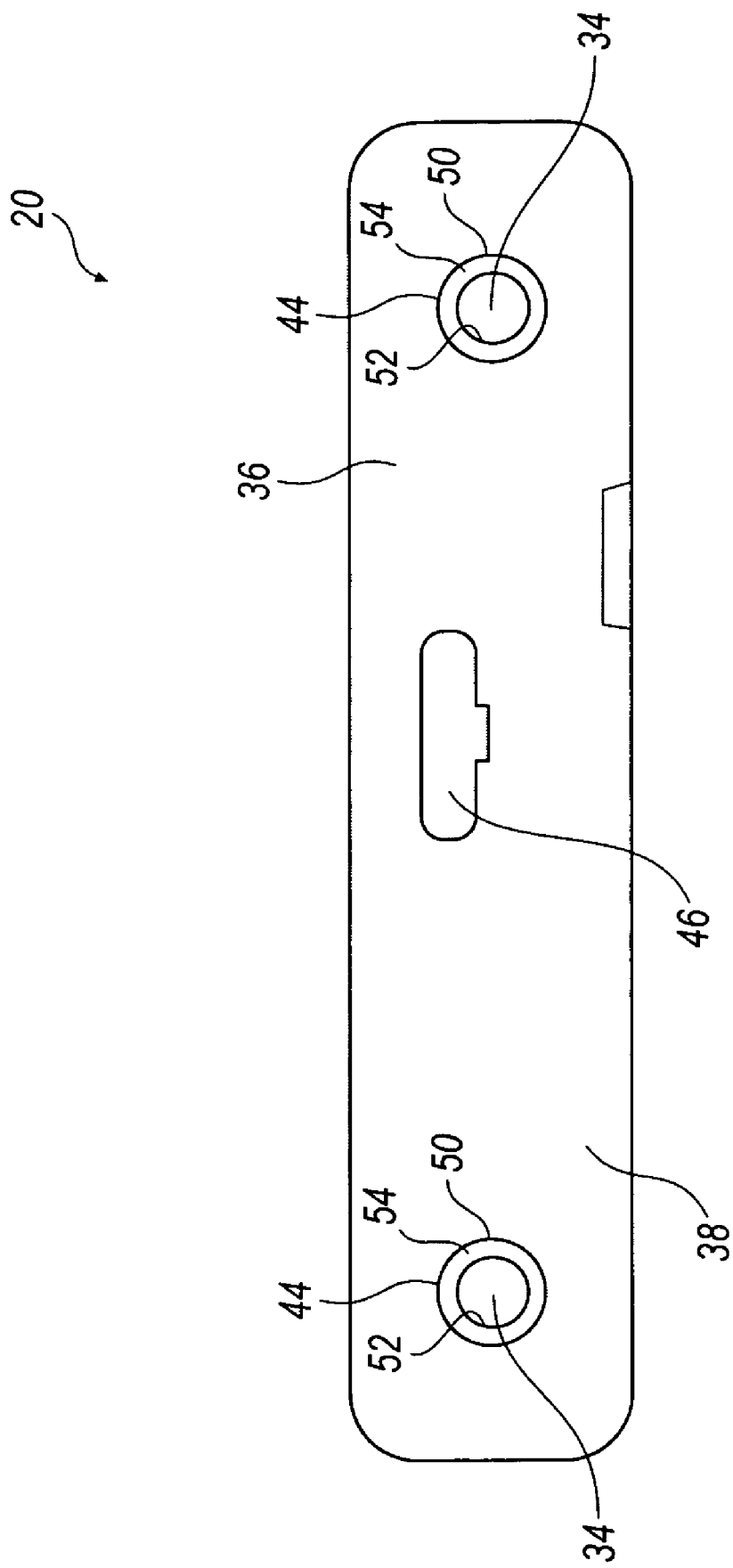
FIG. 8 is a top plan view of the adjustable boss of FIG. 1.

A plurality of ribs 60 as best seen in FIGS. 5 and 6 may be disposed on the outer surface 56 of the lower protrusion 42 further strengthening the lower protrusion 42 from the load of the rack assembly 24 and its associated contents. In one embodiment, the lower surface 58 of the lower protrusion 42 may include a pad 62 or any elastomeric member that is adapted to seal and protect both the outer surface 22 of the vehicle and the lower surface 58 of the adjustable boss 20. The pad 62 may be in the shape of the lower protrusion 42 or any shape having an aperture 64 adapted to receive fastener 28. The pad 62 or seal is formed from a plastic or a rubber material that impedes movement and generally keeps the rack assembly 24 from moving on the vehicle outer surface 22 by providing a non-slip surface between the adjustable boss 20 and the vehicle outer surface 22.

The adjustable boss 20 selectively engages the slot 30 of the support structure 26 of the rack assembly 24 and defines a distance in the fore and aft direction the adjustable boss 20 may move by having the upper protrusion 44 extending upwardly from the upper surface 38 of the body 36 selectively engaging the slot 30. The adjustable boss 20 may also engage the slot 30 of the support structure 26 by having the aperture 34 of the upper protrusion 44 selectively accepting a second structure that is disposed within the aperture 34 and selectively engages the slot 30 of the support structure 26.

In a secured orientation, the lower surface 58 of the lower protrusion 42 is in selective contact with the vehicle outer surface 22 and is adapted to be secured onto the vehicle outer surface 22. The lower surface 58 may be planar or adjusted as appropriate to selectively engage a non-planar vehicle surface 22. The pad 62 or seal disposed on the lower surface 58 facilitates sealing between the adjustable boss 20 and the vehicle outer surface 22.

As stated above, the adjustable boss 20 is secured between the support structure 26 of the rack assembly 24 and the vehicle outer surface 22 allowing a fastener 28 having the smaller head 29 to be used since it is covering an aperture 34 as opposed to larger aperture such as aperture 32. The upper surface 54 of the upper protrusion 44 provides the adjustable boss 20 the advantage of using a smaller headed fastener 28 in areas where a larger headed fastener would not typically fit. It also provides esthetic improvements by minimizing the focus on the fastener as compared to prior known approaches. The head 29 of the fastener 28 covers and seals the aperture 34, sealing the aperture 34 from containments and fluids that would otherwise travel down a shank portion of the fastener 28 and into the vehicle interior. The adjustable boss 20 provides the user the benefit of sliding the rack assembly a pre-determined distance based on the length of the slot 30 on the support structure 26 of the rack assembly 24 prior to securing the rack assembly 24 onto the vehicle outer surface 22.

The embodiment in FIGS. 1–6, and 8 therefore, illustrate an adjustable boss 20 that provides the user the ability to have a support structure 26 that accounts for the build tolerances on vehicle outer surfaces 22, prevents the undesirable intrusion of contaminants into a vehicle interior, allows the use of the fastener 28 with the smaller head 29 and thereby providing an enhanced ability to locate the support structure in harder to reach orientations as well as an enhanced esthetic appearance, and also minimizes undesirable rotation between mating components.

Figure 9:
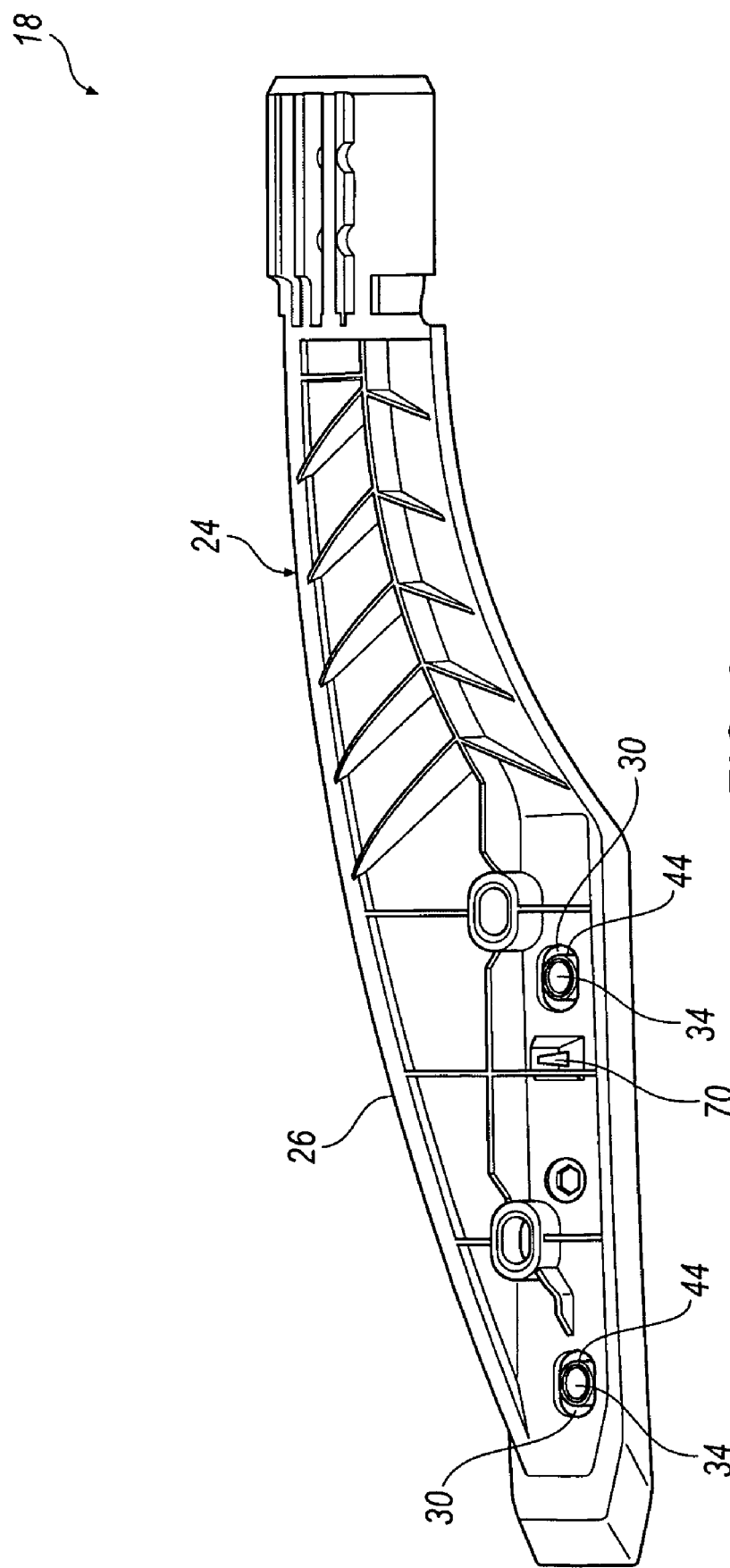
FIG. 9 is an elevational perspective view of a second embodiment of an adjustable boss showing a rail mount without a cover.
Figure 10:
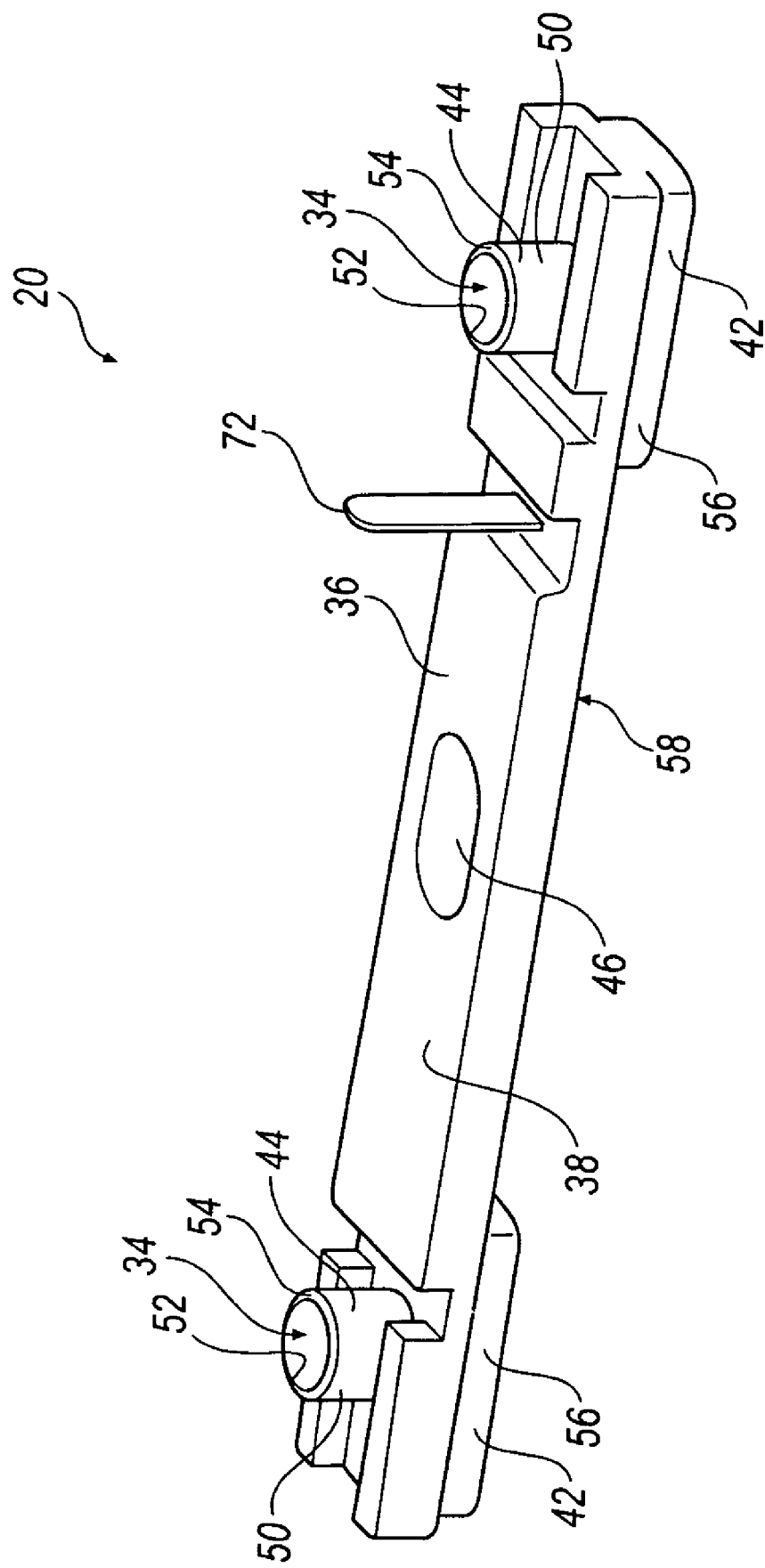
FIG. 10 is an elevational perspective view of the adjustable boss of FIG. 9.

Now referring to FIGS. 9 and 10, a further embodiment of the adjustable boss 20 is shown. The element numbers above are also included and represented in the second embodiment to represent generally the same type of elements. A centering feature 70 is further included in the support structure 26 for retaining the adjustable boss 20 in a normal position. The normal position includes having the upper protrusions 44 generally centrally disposed in a respective slot 30. The centering feature 70 is adapted to accept a tab 72 disposed on the adjustable boss 20 as shown in FIG. 10. The tab 72 extends outwardly from upper surface 30 and selectively flexes as the adjustable boss 20 is moved in the fore and aft direction.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. An adjustable boss assembly for use with a vehicle outer surface, the vehicle outer surface including at least one aperture, the adjustable boss assembly comprising:
    an adjustable boss including
        a body having an upper surface, and a lower surface,
        a first protrusion extending outwardly from said lower surface,
        a second protrusion extending outwardly from said upper surface, said
        protrusions defining a fastener aperture, and
        whereby said first protrusion selectively engages the vehicle outer surface; and
        a vehicle component having a slot, wherein said second protrusion selectively engages the slot in the vehicle component.

2. The adjustable boss of claim 1, wherein said body is secured to the vehicle component by a fastener.

3. The adjustable boss of claim 1, wherein said first protrusion includes a lower surface having a pad.

4. The adjustable boss of claim 1, wherein said adjustable boss selectively seals the aperture on the vehicle outer surface and minimizes the intrusion of contaminants into the aperture of the vehicle outer surface.

5. The adjustable boss of claim 1, wherein a tab is disposed on said adjustable boss extending outwardly from said upper surface for placing said adjustable boss in a normal position.

6. The adjustable boss of claim 1, further comprising a plurality of first protrusions and a corresponding plurality of second protrusions selectively minimizing rotation between said adjustable boss and the vehicle outer surface.

7. The adjustable boss of claim 1, further comprising a means for selectively placing said adjustable boss in a normal position.

8. The adjustable boss of claim 1, wherein said means for selectively engaging the aperture of the vehicle outer surface minimizes rotation between said adjustable boss and the vehicle outer surface.

\* \* \* \* \*